W. J. KEEP.
Stovepipe Damper.
No. 102,407. Patented April 26, 1870.
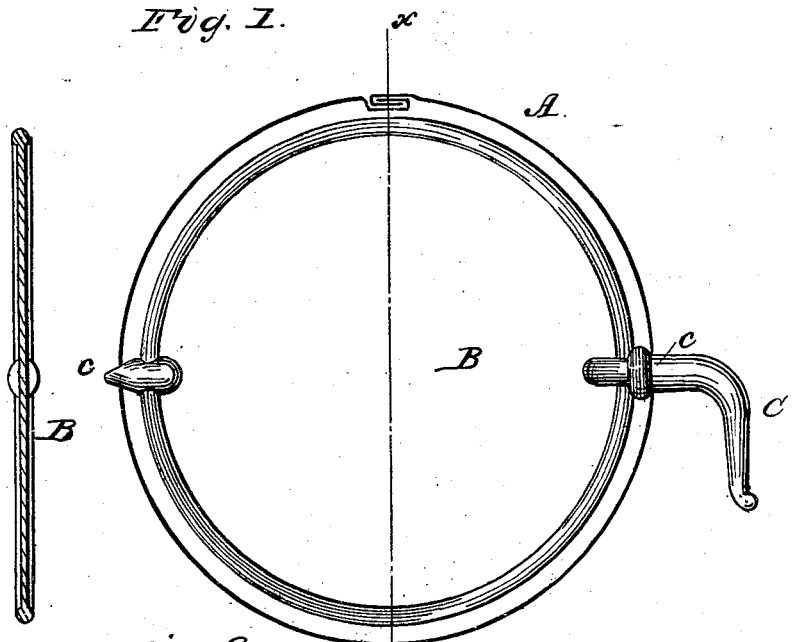

United States Patent Office.

WILLIAM J. KEEP, OF TROY, NEW YORK.

Letters Patent No. 102,407, dated April 26, 1870.

STOVE-PIPE DAMPER.

The Schedule referred to in these Letters Patent and making part of the same.

To all whom it may concern:

Be it known that I, WILLIAM J. KEEP, of Troy, in the county of Rensselaer and in the State of New York, have invented a new and useful Improvement in Stove-Pipe Dampers; and do hereby declare that the following is a full, clear, and exact description thereof, reference being had to the accompanying drawing making a part of this specification, in which—

Figure 1 is a cross-section of the stove-pipe, showing the damper in place;

Figure 2 is a front elevation of said pipe, showing the position of the handle when the damper is opened;

Figure 3 is an edge view of the damper; and

Figure 4 is a central cross-section of the same on the line $x\ x$ of figs. 1 and 3.

Letters of like name and kind refer to like parts in each of the figures.

My invention is an improvement upon a stove-pipe damper invented by Robert Ham, constructed with axial pivots, smallest upon their outer ends, so as to permit said damper to be placed in position from the inside of the pipe; and It consists in the peculiar form of the handle, which is permanently attached to one of the axial pivots, and will readily pass outward through the opening provided for the same, as is hereinafter fully shown.

In order to better illustrate my invention, I will first describe the construction and operation of Ham's damper, and afterward my improvement.

In the annexed drawing—

A represents the stove-pipe of usual form and construction.

The damper B consists of a flat circular disk of metal, somewhat less in diameter than the pipe, having cast or otherwise permanently attached thereto, at equidistant points upon its periphery, two pivots $c$ and $c'$, which pass through corresponding openings in said pipe, and form axial bearings for said damper. These pivots may be of any desired shape, either conical, or with parallel sides and a shoulder, but must be smallest at their outer ends, so as to pass through the openings in the pipe from the inside.

When constructed with parallel sides, the distance between the shoulders of the pivots should be a little more than the inside diameter of the pipe, the inward springs of which, when the damper is in place, will cause sufficient friction upon said shoulders to hold said damper in whatever position it may be placed; but, when the conical pivots are used, the holes in said pipe should be of such a size as to permit the pipe to spring inward sufficiently to produce the same result.

When thus constructed, the damper is placed in position by being passed edgewise into the pipe until the end of one of the pivots can be inserted in the opening, after which, by springing inward the sides of the pipe opposite the pivot holes, the damper may be pressed downward until the opposite pivot enters its hole, when the pipe, upon being released, will return to shape and firmly hold said damper.

In order that the damper may now be operated from without, a handle is secured upon the flattened or squared end of one of the pivots.

As seen in the drawings, I prolong one of the pivots $c'$ and curve it upward at a right angle, or thereabouts, to the axis of the damper and parallel with the edge of the same, by which means I produce a handle, C, that can be readily passed through the pivot hole and allows the damper to be as easily placed in position as though said handle was not attached thereto.

The advantages possessed by this construction are that it materially lessens the cost of the damper, and at the same time renders it easier of application and more durable.

Having thus fully set forth the nature and merits of my improvement,

What I claim as new, and desire to secure by Letters Patent, is—

The handle C, or its equivalent, permanently attached to and in combination with the damper B, substantially as and for the purpose specified.

In testimony that I claim the foregoing, I have hereunto set my hand this 21st day of August, 1869.

WILLIAM J. KEEP.

Witnesses:
CHAS. H. ADAMS,
F. P. LANG.